United States Patent
Nemoto

(10) Patent No.: US 8,990,729 B2
(45) Date of Patent: Mar. 24, 2015

(54) MANIPULATING DISPLAY OF MULTIPLE DISPLAY OBJECTS

(75) Inventor: Kazuo Nemoto, Miyazakidai (JP)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 13/396,220

(22) Filed: Feb. 14, 2012

(65) Prior Publication Data

US 2012/0151407 A1 Jun. 14, 2012

Related U.S. Application Data

(62) Division of application No. 12/159,116, filed as application No. PCT/JP2006/325411 on Dec. 20, 2006, now Pat. No. 8,140,997.

(30) Foreign Application Priority Data

Dec. 26, 2005 (JP) .................................. 2005-372563

(51) Int. Cl.
*G06F 3/048* (2013.01)
*G06F 9/44* (2006.01)
*G09G 5/14* (2006.01)

(52) U.S. Cl.
CPC .............. *G06F 9/4443* (2013.01); *G06F 3/048* (2013.01); *G09G 5/14* (2013.01)
USPC ............................ 715/795; 715/802; 715/790

(58) Field of Classification Search
USPC .......................................... 715/795, 802, 790
See application file for complete search history.

(56) References Cited

U.S. PATENT DOCUMENTS

| | | | | |
|---|---|---|---|---|
| 6,304,259 | B1 * | 10/2001 | DeStefano | 715/805 |
| 6,523,048 | B2 * | 2/2003 | DeStefano | 715/234 |
| 6,577,330 | B1 * | 6/2003 | Tsuda et al. | 715/782 |
| 8,645,849 | B2 * | 2/2014 | Forutanpour et al. | 715/760 |
| 8,732,600 | B2 * | 5/2014 | Robert et al. | 715/767 |
| 2011/0113363 | A1 * | 5/2011 | Hunt et al. | 715/800 |
| 2013/0205239 | A1 * | 8/2013 | Holland | 715/766 |
| 2014/0109001 | A1 * | 4/2014 | Louch et al. | 715/794 |

FOREIGN PATENT DOCUMENTS

JP 06-083560 3/1994

* cited by examiner

*Primary Examiner* — David Phantana Angkool
(74) *Attorney, Agent, or Firm* — Steven M. Greenberg, Esq.; CRGO Law

(57) ABSTRACT

A method for manipulating display of multiple ordered and at least partially overlapping display objects on a display device includes: recording the current position in a stacking order of each of the multiple display objects in an object identifier table in association with a corresponding object identifier; changing the position in the stacking order of a first object in response to a first user action for selecting the first object; recording the position in the stacking order of the first object before the position is changed in the object identifier table as a previous position in the stacking order; and changing the position in the stacking order of the first object with the previous position in the stacking order of the first object in response to a second user action for restoring the changed position in the stacking order of the first object to the previous position in the stacking order.

9 Claims, 8 Drawing Sheets

|  | WINDOW ID | CURRENT STACKING ORDER | PREVIOUS STACKING ORDER |
|---|---|---|---|
| (401) | 1 | 1 |  |
| (402) | 2 | 2 |  |
| (403) | 3 | 3 |  |
| (404) | 4 | 4 |  |

|  | WINDOW ID (710) | CURRENT STACKING ORDER (720) | PREVIOUS STACKING ORDER (730) |
|---|---|---|---|
| (401) | 1 | 2 | |
| (402) | 2 | 3 | |
| (403) | 3 | (3→)1 | 3 |
| (404) | 4 | 4 | |

|  | WINDOW ID (710) | CURRENT STACKING ORDER (720) | PREVIOUS STACKING ORDER (730) |
|---|---|---|---|
| (401) | 1 | (2→)3 | |
| (402) | 2 | 2 | |
| (403) | 3 | 1 | 3 |
| (404) | 4 | 4 | |

| | WINDOW ID 710 | CURRENT STACKING ORDER 720 | PREVIOUS STACKING ORDER 730 |
|---|---|---|---|
| (401) | 1 | 3 | |
| (402) | 2 | 4 | |
| (403) | 3 | 2 | (3→)4 |
| (404) | 4 | 5 | |
| (405) | 5 | 1 | |

| | WINDOW ID 710 | CURRENT STACKING ORDER 720 | PREVIOUS STACKING ORDER 730 |
|---|---|---|---|
| (401) | ~~1~~ | ~~2~~ | |
| (402) | 2 | 2 | |
| (403) | 3 | 1 | (3→2) |
| (404) | 4 | 3 | |

334

MANIPULATING DISPLAY OF MULTIPLE DISPLAY OBJECTS

CROSS-REFERENCE TO RELATED APPLICATIONS

This application is a Divisional of U.S. application Ser. No. 12/159,116, filed Jun. 25, 2008, now U.S. Pat. No. 8,140,997, which is a national stage entry of PCT/JP2006/325411, which claims priority to Japanese Patent Application No. 2005-372563, filed Dec. 26, 2005. All of which are incorporated herein by reference.

TECHNICAL FIELD

The present invention generally relates to a graphical user interface. In particular, the present invention relates to a method, program and data processing system for manipulating display of multiple display objects at least partially overlapping one another and being ordered.

BACKGROUND ART

Multiwindow operating systems which display multiple programs that are running concurrently as multiple windows are widely used for business and personal use in these days. Typical multiwindow systems include Windows® operating system from Microsoft Corporation, MacOS® from Apple Inc., and X Window System from UNIX®.

In a data processing system having a multiwindow operating system, the efficiency of operation of a window object (hereinafter simply referred to as a "window") on a display device has a great impact on user productivity. For example, it is important to quickly switching between applications by efficiently changing the order in which windows are stacked. Accordingly, companies in the computer industry have developed the following techniques for improving window operations.

Japanese Published Unexamined Patent Application No. 10-207678 discloses a method for switching between window displays in which some of windows are iconized and the others are displayed in a normal manner on the basis of predetermined settings and the priorities of the windows displayed in a normal manner are changed in order.

Japanese Published Unexamined Patent Application No. 5-241754 discloses a multiwindow display device in which the order in which intricately stacked windows is changed by specifying a window number through a keyboard to select a desired window, rather than displaying a desired window at the top of the stack by clicking to select the window.

Japanese Published Unexamined Patent Application No. 9-330198 discloses a method for displaying windows in which a particular window is always displayed at the bottom of a stack and, when the order in which windows are displayed is changed, detection is made as to whether the particular window is displayed at the bottom and, if not, the particular window is displayed at the bottom of the stack.

Japanese Published Unexamined Patent Application No. 2001-209523 discloses a method for displaying windows in which a certain region is set in an image displayed and the image contained in the set region is always displayed as the top layer.

Patent Document 1: Published Unexamined Patent Application No. 10-207678

Patent Document 2: Published Unexamined Patent Application No. 5-241754

Patent Document 3: Published Unexamined Patent Application No. 9-330198

Patent Document 4: Published Unexamined Patent Application No. 2001-209523

Typically, a user of a multiwindow operating system can bring a particular window that is not on the top of a stack to the top to make it active by clicking the window. The user can mistakenly click a window other than a window to be activated to raise it to the top. In such a case, the user probably wants to restore the stacking order of the windows to the state immediately before the clicking simply by a "single" user action.

However, depending on the number of windows and the state of stacking, the stack order immediately before clicking cannot be restored by a "single" action (for example, a click on the window that was at the top of the stack immediately before the clicking). For example, consider a case where a user mistakenly click window 403 instead of window 404 to raise the window to the top of the stack on a desktop screen (FIG. 4) on which windows 401, 402, 403, and 404 are stacked in this order viewed from the top. As a result of the erroneous operation, the windows are displayed in the following stacking order viewed from the top: windows 403, 401, 402, and 404. When the user clicks window 401, which was at the top of the stack immediately before mistakenly clicking, in order to restore from the erroneous operation, the order in which the windows are stacked changes as follows: windows 401, 403, 402, and 404, viewed from the top. It is difficult to restore by a "single" action the order in which the windows were stacked immediately before the erroneous click, as windows 401, 402, 403, and 404 in this order.

It will be understood from the foregoing that several user actions may be required in order to restore the previous state when a user has erroneously performed a window operation, adversely affecting the user's productivity. The conventional techniques including those disclosed in Patent Documents 1 to 4 and combinations of these cannot solve the problem.

One of the objects of the present invention is to provide a method, program, and data processing system for manipulating display of multiple display objects (preferably window objects) on a display device that are ordered and at least partially overlap one another.

BRIEF SUMMARY OF THE INVENTION

To achieve the object described above, there is provided a method for manipulating display of multiple display objects on a display device in a data processing system connected to the display device, the multiple display objects being ordered and at least partially overlapping each other. The method includes the steps of: recording a current position in a stacking order of each of the multiple display objects in an object identifier table in association with a corresponding object identifier; changing the position in the stacking order of a first object in response to a first user action for selecting the first object; and recording the position in the stacking order of the first object before the position is changed in the object identifier table as the previous position in the stacking order. The method also includes the step of changing the position in the stacking order of the first object with the previous position in the stacking order of the first object in response to a second user action for restoring the changed position in the stacking order of the first object to the previous position in the stacking order. The multiple display objects are preferably window objects.

Preferably, the method may further include the step of lowering a position in the stacking order of a second object in accordance with a predetermined rule in response to the second user action performed for the second object, on condition that a previous position in the stacking order is not associated with the second object.

Preferably, the step of changing the position in the stacking order of the first object in response to the first user action in the method according to claim 1 includes the step of raising the position in the stacking order of the first object in response to the first user action for selecting the first object.

While the present invention has been summarized as a method for manipulating display of multiple display objects, the present invention can also be viewed as a data processing system, a program, or a program product. Examples of the program product may include a storage medium on which the program described above is stored and a medium that transmits the program.

It should be noted that the summary of the invention given above is not intended to enumerate all of the essential features of the present invention but a combination and sub-combination of the components are also included in the present invention.

BRIEF DESCRIPTION OF THE DRAWINGS

FIG. 8 is a conceptual diagram of the window ID table after a first user action is performed on window 403 and the window 403 is brought to the top of the stack in an embodiment of the present invention;

FIG. 9 is a conceptual diagram of the window ID table after a second user action is performed on window 401 in an embodiment of the present invention;

FIG. 10 is a conceptual diagram of the window ID table after a third user action is performed and a new window 405 is generated in an embodiment of the present invention; and FIG. 11 is a conceptual diagram of the window ID table after a fourth user action is performed on window 401 in one embodiment of the present invention.

DETAILED DESCRIPTION OF THE INVENTION

Figure 1:
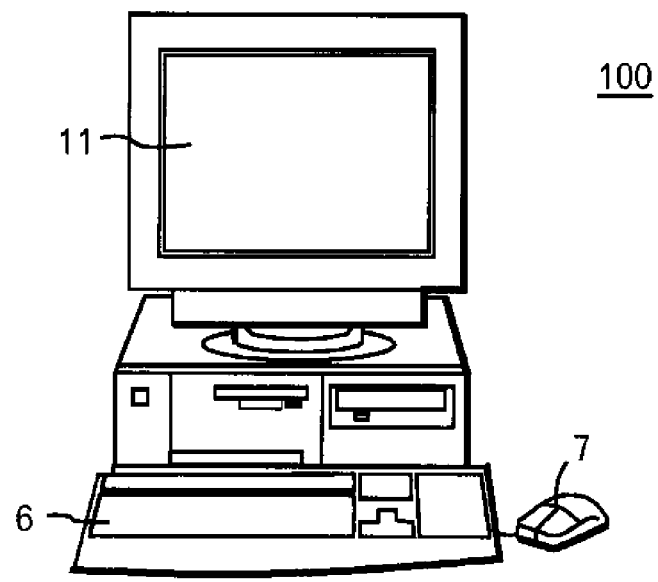
FIG. 1 shows an exemplary external view of a data processing system in an embodiment of the present invention.

The best mode for carrying out the present invention will be described with reference to the accompanying drawings. However, the embodiments described below are not intended to limit the present invention according to the claims and not all combinations of the features described in the embodiments are essential to the inventive solution.

The present invention can be implemented in many different modes and should not be construed as being limited to the embodiments described. It should be noted that not all combinations of the features described in the description of the embodiments are essential to the inventive solution. Like elements are labeled with like reference numerals throughout the description of the embodiments.

FIG. 1 shows an exemplary external view of a data processing system 100 according to an embodiment of the present invention. The data processing system 100 according to the embodiment of the present invention includes a keyboard 6, a mouse 7, and a display device 11.

The display device 11 of the data processing system 100 according to the embodiment of the present invention visually presents information such as the status of a task to a user. The user can use input devices such as the keyboard 6 and the mouse 7 to manipulate multiple windows displayed by a multiwindow operating system on the display device 11 to use a desired application among one or more computer software applications. The user performs a switching operation of one or more windows displayed (for example, an operation for bringing up/down a window) in order to activate an application to operate.

Figure 2:
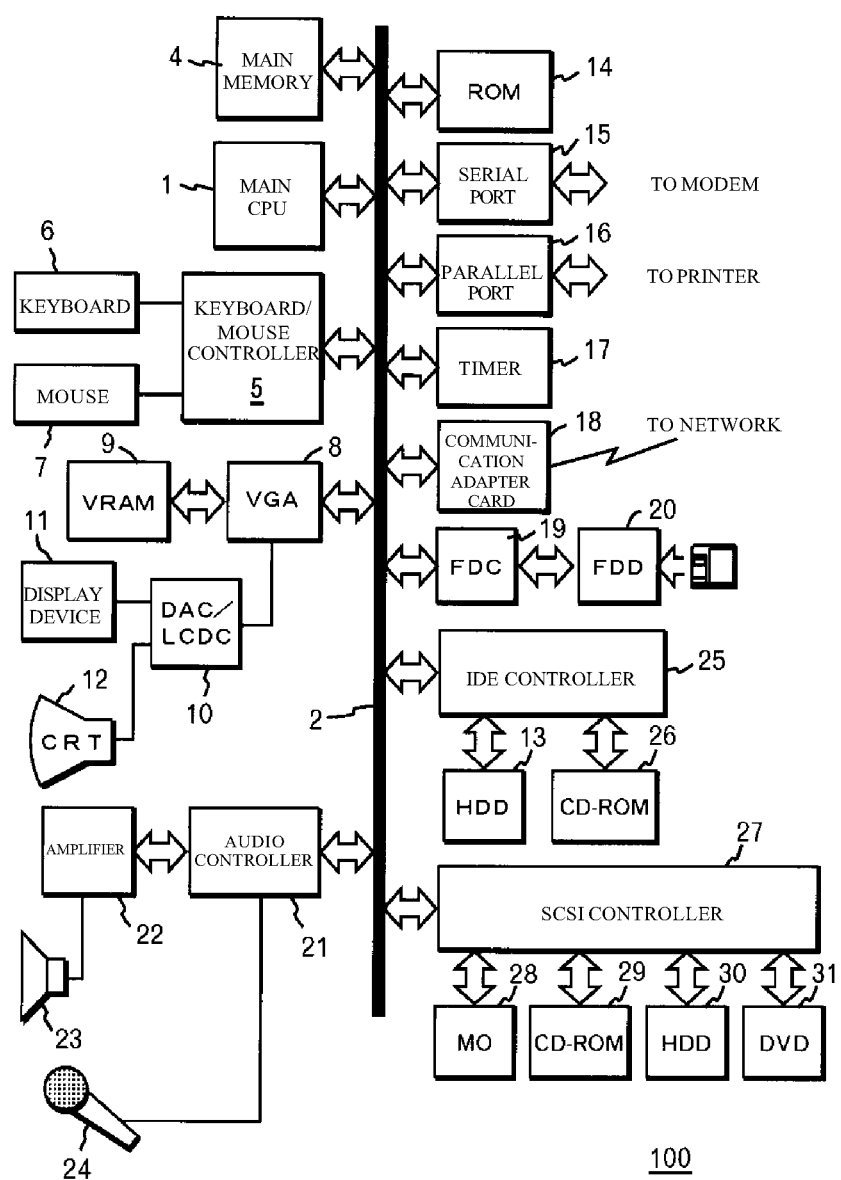
FIG. 2 shows an exemplary hardware configuration of an information processing apparatus suitable for implementing a data processing system in an embodiment of the present invention.

FIG. 2 shows an exemplary hardware configuration of an information processing apparatus suitable for implementing the data processing system 100 according to the embodiments of the present invention. The information processing apparatus includes a CPU (Central Processing Unit) 1 and a main memory 4 connected onto a bus 2. Connected onto the bus 2 are hard disk devices 13, 30 and removable storages (external storage systems in which recording media are exchangeable) such as CD-ROM devices 26, 29, flexible disk device 20, MO device 28, and DVD device 31, through a floppy disk controller 19, an IDE controller 25, a SCSI controller 27, or the like.

Storage media such as a flexible disk, MO, CD-ROM, and DVD-ROM are placed in the removable storages. Computer program codes for providing instructions to implement the present invention in cooperation with an operating system can be recorded on these storage media, the hard disk devices 13, 30, and a ROM 14. The computer program is loaded into the main memory 4 and executed. The computer program can be compressed or divided into multiple units and recorded on multiple media. With specific reference to a computer-readable storage medium, it is to be understood that a computer-readable storage medium excludes transitory media such as transitory signals and other propagation media.

The information processing apparatus receives an input from input devices such as the keyboard 6 and the mouse 7 through a keyboard/mouse controller 5. The information processing apparatus is connected to the display device 11 through a DAC/LCDC 10 for presenting visual data to a user.

The information processing apparatus is capable of connecting to a network and communicating with another apparatus such as another computer through a network adapter 18 (Ethernet® card or a token ring card) or the like. Although not shown, a printer and a modem can also be connected to the information processing apparatus through a parallel port and a serial port, respectively.

It will be readily understood from the foregoing description that an information processing apparatus suitable for implementing the data processing system 100 according to the embodiments of the present invention is implemented by a conventional information processing apparatus such as a personal computer, a workstation, or a mainframe or a combination of these. However, these components are illustrative only and not all the components are essential components of the present invention.

Various modifications will be readily contemplated by those skilled in the art, such as combining multiple machines and allocating functions to the machines to implement the hardware components of the information processing apparatus used in an embodiment of the present invention. Those modifications are concepts included understandably in the spirit of the present invention.

The data processing system 100 uses an operating system that supports a GUI (Graphical User Interface) multiwindow environment, such as Windows® operating system provided by Microsoft Corporation, MacOS® provided by Apple Computer Incorporated, a UNIX®-based system including X Window System (for example AIX® provided by International Business Machines Corporation or Linux®).

From the foregoing, it will be understood that the data processing system 100 used in embodiments of the present invention is not limited to a particular multiwindow operating system environment.

Figure 3:
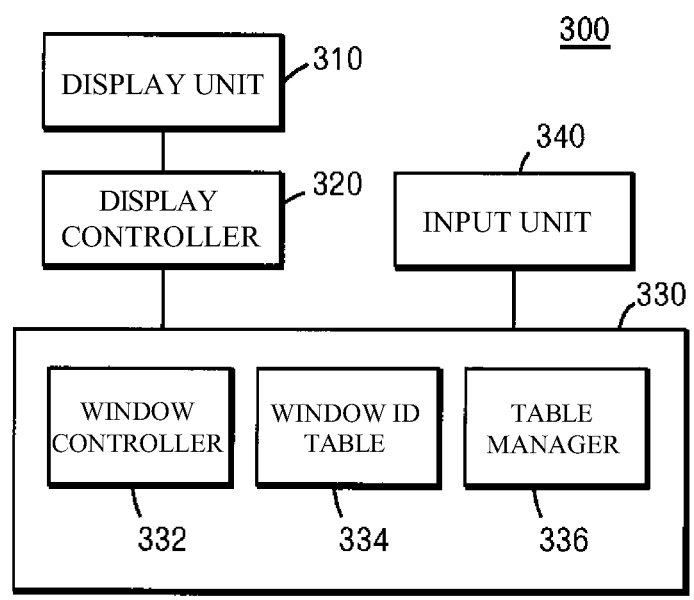
FIG. 3 is a functional block diagram of a data processing system in an embodiment of the present invention.

FIG. 3 is a functional block diagram of a data processing system 100 according to an embodiment of the present invention. The components shown in the functional block diagram of FIG. 3 can be implemented by loading an operating system and a computer program stored in a storage such as a hard disk device 13 in an information processing apparatus having a hardware configuration as illustrated in FIG. 3 into the main memory 4 and then by causing the CPU 1 to read them to cause hardware and software resources to cooperate with each other.

The data processing system 100 includes a display unit 310, a display controller 320, an operating system 330, and an input unit 340. The display unit 310 displays a desktop screen or the like of a multiwindow operating system in accordance with an instruction from the display controller 320. The display controller 320 sends an instruction to display a screen to be displayed on the display unit 310 and controls operation of the display unit 310. The input unit 340 is implemented by a keyboard 6, a mouse 7, and the like. The input unit 340 receives an input from a user operating the data processing system 100.

The operating system 330 provides resource management functions that allow software such as application software to use resources of the data processing system 100. For example, the operating system 330 provides hardware resource management, file handle, spool, job management, storage protection, and virtual storage management functions (not shown). These functions are well known to those skilled in the art and therefore detailed description of which will be omitted.

The operating system 330 includes a window controller 332, a window ID table 334, and an ID table manager 336. The window controller 332 manages one or more running applications as windows and displays the windows on the display unit 310 to present them to a user. It should be noted that the operating system 330 according to the embodiments of the present invention includes the window ID table 334 for managing a stacking order of one or more windows currently being displayed by using a window identifier (window ID) associated with each of the windows and the ID table manager 336 that manages the table. The data processing system 100 of the embodiments of the present invention uses these components to implement a window operation "UNDO" function and other window manipulating functions.

Figure 4:
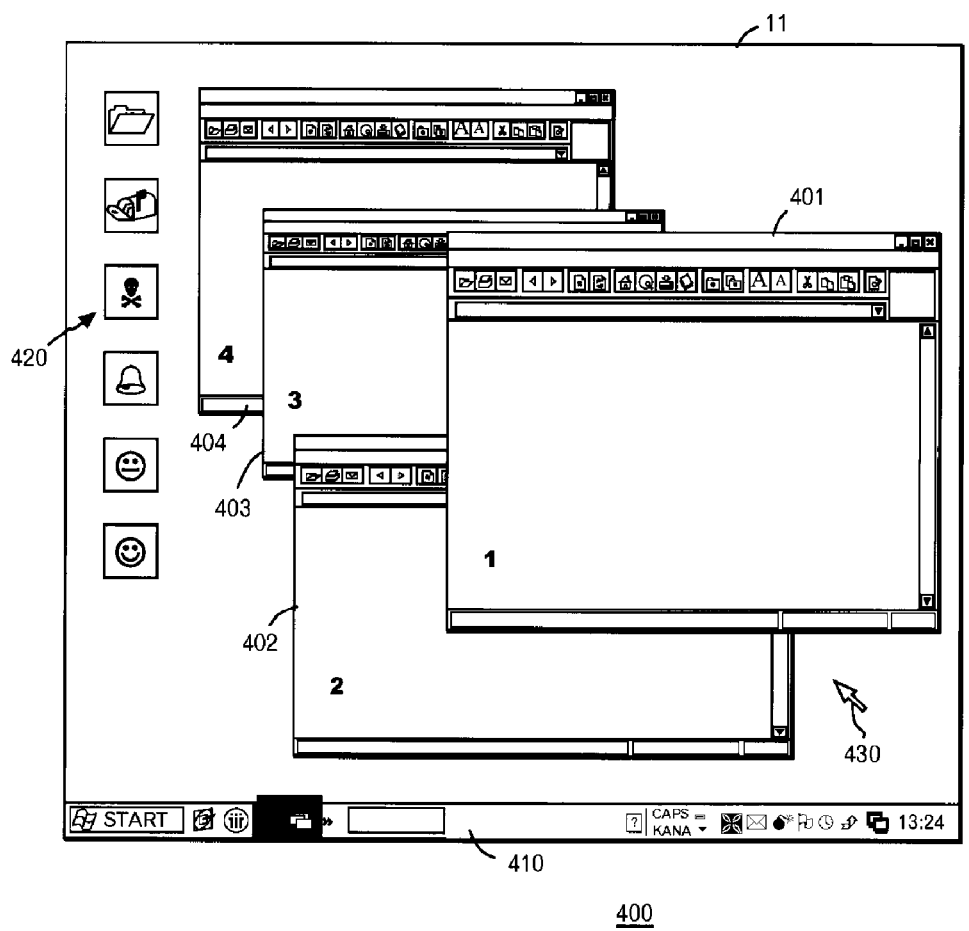
FIG. 4 shows a desktop screen of a data processing system including a multiwindow operating system in an embodiment of the present invention.

FIG. 4 shows a desktop screen 400 displayed on a display unit 310 implemented by a display device 11 of a data processing system 100 including a multiwindow operating system according to an embodiment of the present invention. Displayed on the desktop screen are multiple windows 401 to 404, a task bar 410, a set of icons 420, and a pointer 430. The windows 401 to 404 are window representations of applications currently running. The individual windows are displayed in a stacking order recorded in a window ID table 334 and the application corresponding to the window at the top of the stack is active. The task bar 401 is a bar for presenting functions of the operating system 330. A start button, time of day, and the icons of resident applications are displayed on the task bar 410. The icons 420 represent programs, directories (folders), or files. In an embodiment of the present invention, when a user double-clicks an icon representing an application program with a mouse, the application is activated and its corresponding window is displayed. Details of such a multiwindow operating system are well known to those skilled in the art and therefore detailed description of which will be omitted.

Figure 5:
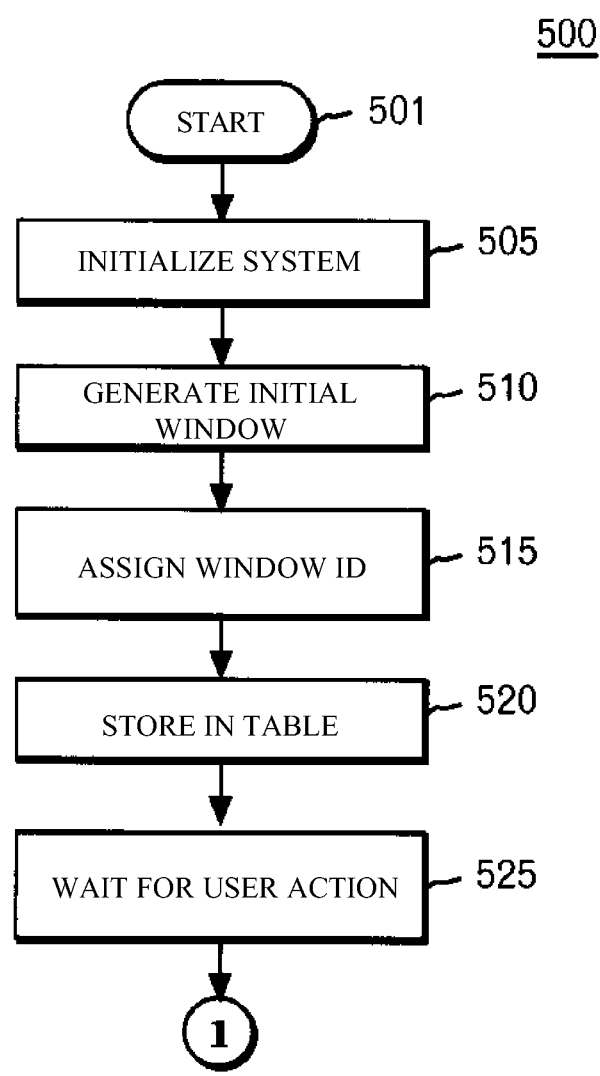
FIG. 5 is a flowchart illustrating an operation before completion of initialization of a data processing system in an embodiment of the present invention.

FIG. 5 is a flowchart 500 illustrating an operation for initializing a data processing system 100 including a multiwindow operating system according to an embodiment of the present invention. The process starts at step 501 and the system is initialized at step 505. Then, the operating system 330 activates an initial activation application (in the case of Windows® operating system, an application specified as a "startup program") at step 510 and the window controller 332 generates an initial window of the activated initial application. The process proceeds to step 515, where the ID table manager 336 generates a unique window ID for the window displayed on the desktop screen.

Figures 6, 7:
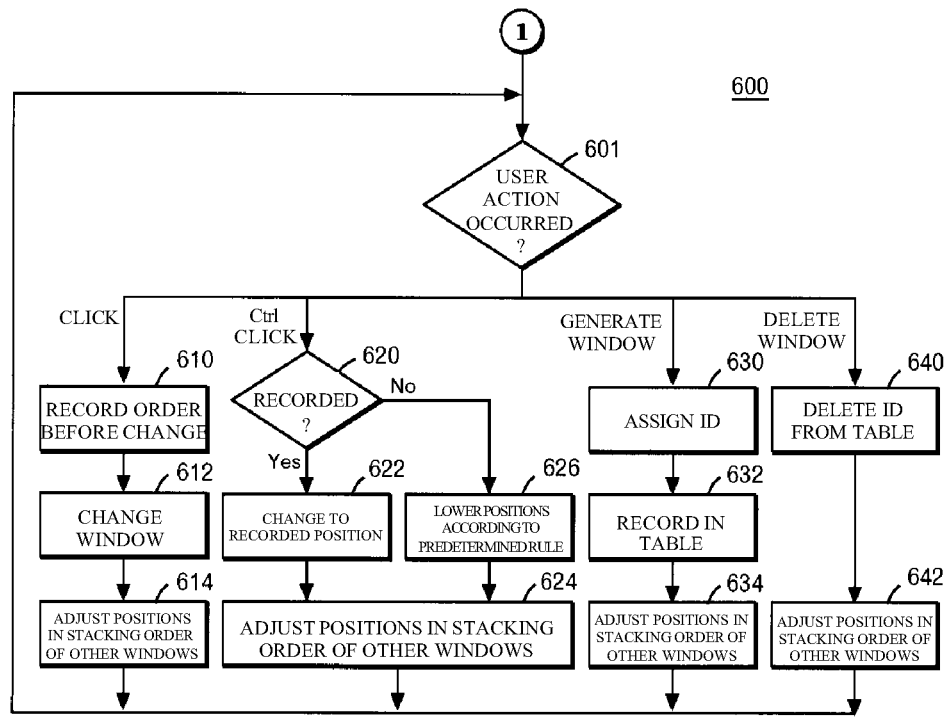
FIG. 6 is a flowchart illustrating an operation of a data processing system when a predetermined user action is performed in the system in an embodiment of the present invention.
FIG. 7 is a conceptual diagram of a window ID table for initial windows 401 to 404 in an embodiment of the present invention.

Then, the ID table manager 336 associates the generated window ID with a position in the stacking order of the window and stores them in a window ID table 334. In an embodiment of the present invention, the window ID table 334 contains the window ID 710 of the window of each application currently being executed, the current window position in the stacking order (hereinafter referred to as the "current position in the stacking order" 720), and the window position in the stacking order before an event that changed the latest window position in the stacking order occurred (hereinafter referred to as the "previous position in the stacking order" 730) of the window of the application. FIG. 7 shows the window ID table 334 for the initial windows 401 to 404. It is assumed here that windows 401, 402, 403, and 404 associated with the window IDs 1 2, 3 and 4 respectively are currently displayed in this order viewed from the top (FIG. 4). After completion of step 520, the process proceeds to step 525, where the process waits for a predetermined user action.

In response to execution of a predetermined action, the process proceeds to the flowchart 600 of FIG. 6 through the circled number 1. FIG. 6 is a flowchart 600 illustrating an operation of the data processing system 100 performed when a predetermined user action is performed on the data processing system 100. The process starts at step 601, where determination is made as to whether what kind of user action has occurred.

A process will be described first that is performed when a first user action for selecting one of multiple windows (hereinafter referred to as the "first window") is performed to generate a window stacking order change event. In an embodiment of the present invention, the window stacking order change event is a window raising or lowering event that changes the position in the stacking order of a window for which a first user action is performed to a higher or lower level. The first user action is typically a depression of an input button of a mouse by a user to click a window to raise the window to the top of the stack, but not limited to this.

When the first user action for selecting the first window is performed, the process proceeds from step 601 to step 610. The position in the stacking order of the first window before change is recorded in the window ID table 334 as the previous position in the stacking order 730 at step 610. Then, at step 612, the position in the stacking order of the first window that is the target of the window raise event is changed to a higher level (preferably the top of the stack).

The process proceeds to step 614, where the stacking order of the windows other than the first window are adjusted. In particular, the current and previous positions in the stacking order 720 and 730 of the windows between the position in the stacking order of the first window before the raising and the position in the stacking order of the first window after the raising are lowered by one level. It should be noted that, if the position in the stack order of the first window is lowered in response to the first user action, the current and previous positions in the stacking order 720 and 730 of the windows between the position in the stacking order of the first window before the lowering and the position in the stacking order of the first window after the lowering are raised by one level and thus the action can be readily addressed.

FIG. 8 shows the window ID table 334 after window 403 (with the window ID 3) is clicked in the state of the window ID table 334 shown in FIG. 7 and is raised to the top of the stack. After completion of step 614, the process returns to step 601.

A process will be described that is performed when a second user action (a depression of a predetermined keyboard key (specifically a control key) while at the same time an input button of a mouse is depressed to point a window of interest in the embodiment of the present invention but any other input action may be set, of course) for returning the position in the stacking order of one of multiple windows to its previous position is performed.

When the second user action is performed, the process proceeds from step 601 to step 620. At step 620, determination is made as to whether the previous position in the stacking order 730 of the window of interest is recorded in the window ID table 334. For example, when the first window whose previous position in the stacking order 730 is recorded at step 610 is selected and it is determined that the previous position in the stacking order 730 is recorded, the process proceeds from step 620 to step 622 through the arrow link labeled Yes. At step 622, the table manager 336 uses information indicating the previous position in the stacking order 730 associated with the window of interest and recorded in the window ID table 334 to restore the current position in the stacking order of the window to the recorded position.

The process proceeds to step 624, where the positions in the stacking order of the windows other than the first window are adjusted. In particular, when the position in the stacking order of the first window was raised by restoration, the current and previous positions in the stacking order 720 and 730 of the windows located between the position in the stacking order of the first window before the restoration and the position in the stacking order of the first window after the restoration are lowered by one level. It should be noted that if the position in the stacking order of the first window is lowered by restoration, the current and previous positions in the stacking order 720 and 730 of the windows located between the position in the stacking order of the first window before the lowering and the position in the stacking order of the first window after the lowering are raised by one level and thus the action can be readily addressed.

In this way, the stacking order of multiple windows, including the first window, is "undone". In an example of the operations, when a second user action is performed on window 403 (with the window ID 3) in the state in the window ID table 334 of FIG. 8, the window ID table 334 is restored to the state shown in FIG. 7. After completion of step 624, the process returns to step 601.

On the other hand, if it is determined at step 620 that a window for which a previous position in the stacking order 730 is not recorded (for example one of the multiple windows other than the first window (hereinafter referred to as the "second window") is specified as the window on which the second user action is to be performed, the process proceeds to step 626. At step 626, the position in the stacking order of the window of interest is lowered according to a predetermined rule. In particular, the position in the stacking order of the window of interest is lowered by one level in an embodiment of the present invention. Then, the process proceeds to step 624, where the process as described above is performed. FIG. 9 shows the window ID table 334 after the second user action is performed on window 401 (with the window ID 1). After completion of step 624, the process returns to step 601.

A process will be described that is performed when a third user action for generating a new window is performed to generate a window generation event. The third user action is typically a double-click of an icon on the desktop screen to activate a new application, but is not limited to this. When a new application is activated, the system generates its corresponding window on the desktop screen. An embodiment of the present invention will be described with respect to an example in which the third user action generates a new window (hereinafter referred to as the "third window") at the top of a window stack (generation of the so-called "pop-up window") However, of course, the present invention can be applied also to a case where a new window is generated at a position in the stacking order other than the top.

When the third user action is performed, the process proceeds from step 601 to step 630. At step 630, a window is generated and a unique window ID is assigned to the generated window. The process proceeds to step 632, where the window ID of the third window is recorded in the window ID table 334 as the window at the top of the stack. Then, the current positions in the stacking order 720 and the previous positions in the stacking order 730 (if any) of windows at the positions lower than the third window (that is, all existing windows) are lowered by one level at step 634.

FIG. 10 shows the window ID table 334 after the third user action is performed in the state of the window ID table 334 shown in FIG. 8 to generate a new window 405 (with the window ID 5). After completion of step 634, the process returns to step 601.

A process performed when a fourth user action for deleting an existing window is performed to generate a window deletion event will be described. The fourth user action is typically a click of a window deletion button at the upper right corner of the existing window of interest to delete the window, but is not limited to this. When the fourth user action is performed on one of multiple existing windows (hereinafter referred to as the "fourth window"), the process proceeds from step 601 to step 640. At step 640, the window ID associated with the fourth window is deleted from the window ID table 334. Then, the current positions and previous positions (if any) in the stacking order 720 and 730 of windows at positions lower than the fourth window are raised by one level at step 642.

FIG. 11 shows the window ID table 334 after the fourth user action is performed on window 401 (with the window ID 1) in the state of the window ID table 334 shown in FIG. 8. After completion of step 642, the process returns to step 601.

According to the present invention, when a user mistakenly manipulates a window, for example, the previous state can be restored simply by inputting a "single" user action. Furthermore, the order in the stacking order of a window whose previous position in the stacking order is not recorded can also be changed according to a predetermined rule. It will be readily understood that the productivity of the user operating the multiwindow operating system can be improved accordingly.

The present invention can be implemented by hardware, software, or a combination of hardware and software. A typical example is an implementation by a combination of hardware and software in which a data processing system including a predetermined program perform the method. In that case, when the predetermined program is loaded and executed in the data processing system, the program controls the data processing system to perform processes according to the present invention. The program includes a set of instructions that can be written in any language, code, and notation. The set of instructions allows the system to execute particular functions directly or after 1. The instructions are translated into another language, code, or notation and/or 2. The instructions are copied to another medium.

Of course, the present invention includes not only the program itself but also a medium on which the program is recorded. The program for executing the functions of the present invention can be stored in any computer-readable recording medium such as a flexible disk, MO, CD-ROM, DVD, hard disk device, ROM, MRAM, or RAM. The program can be downloaded or copied from another data processing system connected through a communication line in order to store the program in a recording medium. The program can be compressed or divided into multiple units and stored on a single or multiple recording media. It should be noted that a program product that implements the present invention in various forms, can also be provided, of course.

It will be apparent to those skilled in the art that various modifications or improvements can be made to the embodiments described above. Therefore, embodiments to which such modifications or improvements are made are also included in the technical scope of the present invention, of course.

The invention claimed is:

1. A method for manipulating display of a plurality of display objects on a display device in a data processing system connected to the display device, the plurality of display objects being ordered and at least partially overlapping each other, the method comprising the steps of:
   recording a current position in a stacking order of each of the plurality of display objects in an object identifier table in association with a corresponding object identifier;
   changing the position in the stacking order of a first object in response to a first user action for selecting the first object;
   recording the position in the stacking order of the first object before the position is changed in the object identifier table as a previous position in the stacking order; and
   changing the position in the stacking order of the first object with the previous position in the stacking order of the first object in response to a second user action for restoring the changed position in the stacking order of the first object to the previous position in the stacking order.

2. The method according to claim 1, wherein the step of changing the position in the stacking order of the first object in response to the first user action comprises the step of raising the position in the stacking order of the first object to the top pd a stack in response to the first user action for selecting the first object.

3. The method according to claim 1, wherein the step of changing the position in the stacking order of the first object in response to the first user action comprises the steps of:
   raising the position in the stacking order of the first object in response to the first user action for selecting the first object;
   recording the position in the stacking order of the first object before being raised in the object identifier table as a previous position; and
   lowering by one level the current and previous positions in the stacking order of other display objects located between the position in the staking order of the first object before being raised and the position in the staking order of the object after being raised.

4. The method according to claim 1, wherein the step of changing the position in the stacking order of the first object in response to the first user action comprises the steps of:
   lowering the position in the stacking order of the first object in response to the first user action for selecting the first object;
   recording the position in the stacking order of the first object before the position in the stacking order is lowered in the object identifier table as a previous position in the stacking order; and
   raising by one level the current and previous positions in the stacking order of other display objects located between the position in the stacking order of the first object before being lowered and the position in the stacking order of the first object after being lowered.

5. The method according to claim 1, further comprising the steps of:
   in response to a third user action for generating a new object, generating a third object and assigning a unique object identifier to the third object;
   recording the identifier assigned to the third object in an object identifier table in association with a position in the stacking order of the third object; and
   lowering current and previous positions in the staking order of an existing display object whose position in the stacking order is lower than the position in the stacking order of the third object.

6. The method according to claim 1, further comprising the steps of:
   in response to a fourth user action for deleting a fourth object, deleting the fourth object and deleting an object identifier of the fourth object from the object identifier table; and
   raising by one level current and previous positions in the stacking order of an object whose display position in the stacking order is lower than the position in the stacking order of the fourth object.

7. The method according to claim 1, wherein the data processing system comprises a mouse including an input button, and a keyboard, the first user action is depression of the input button of the mouse and the second user action is depressing a predetermined key of the keyboard while depressing at the same time the input button of the mouse.

8. A computer-readable storage medium having instructions stored thereon that when executed manipulates display of a plurality of display objects on a display device in a data processing system connected to the display device, the plurality of display objects being ordered and at least partially overlapping each other, the program causing the data processing system to perform the steps of:

recording a current position in a stacking order of each of the plurality of display objects in an object identifier table in association with a corresponding object identifier;

changing the position in the stacking order of a first object in response to a first user action for selecting the first object;

recording the position in the stacking order of the first object before the position is changed in the object identifier table as a previous position in the stacking order; and changing the position in the stacking order of the first object with the previous position in the stacking order of the first object in response to a second user action for restoring the changed position in the stacking order of the first object to the previous position in the stacking order.

9. A data processing system having a function of manipulating display of a plurality of display objects on a display device, the plurality of display objects being ordered and at least partially overlapping each other, the data processing system comprising:

a processor configured to enable an object identifier table in which a current display position in a staking order of each of the plurality of display objects is associated with and recorded with a corresponding object identifier;

a table manager causing a position in the stacking order of a first object before the stacking order is changed in the object identifier table as a previous position in the stacking order; and a window controller changing a position in the stacking order of the first object in response to a first user action for selecting the first object and changing the position in the stacking order of the first object with the previous position in the stacking order of the first object in response to a second user action for restoring the position in the stacking order of the first object whose position in the stacking order has been changed.

* * * * *